April 16, 1963 J. H. GERMER 3,085,959
LIQUID MODERATED VAPOR SUPERHEAT REACTOR
Filed Jan. 2, 1959 3 Sheets-Sheet 2
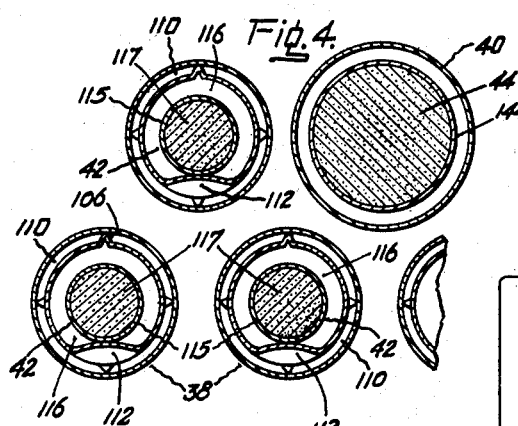
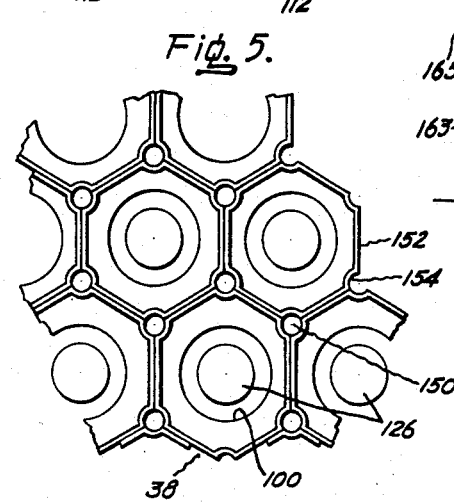
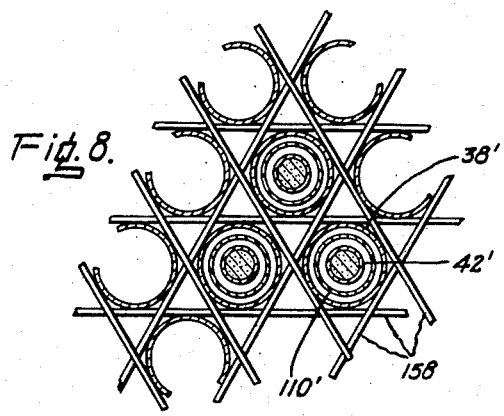
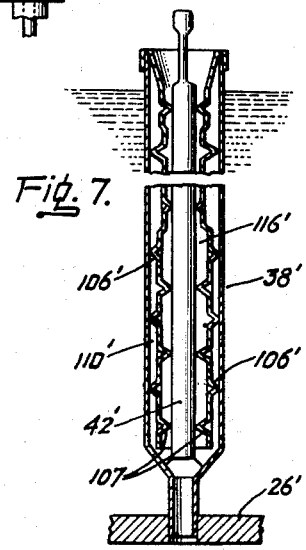
Inventor:
John H. Germer,
by
Attorney.

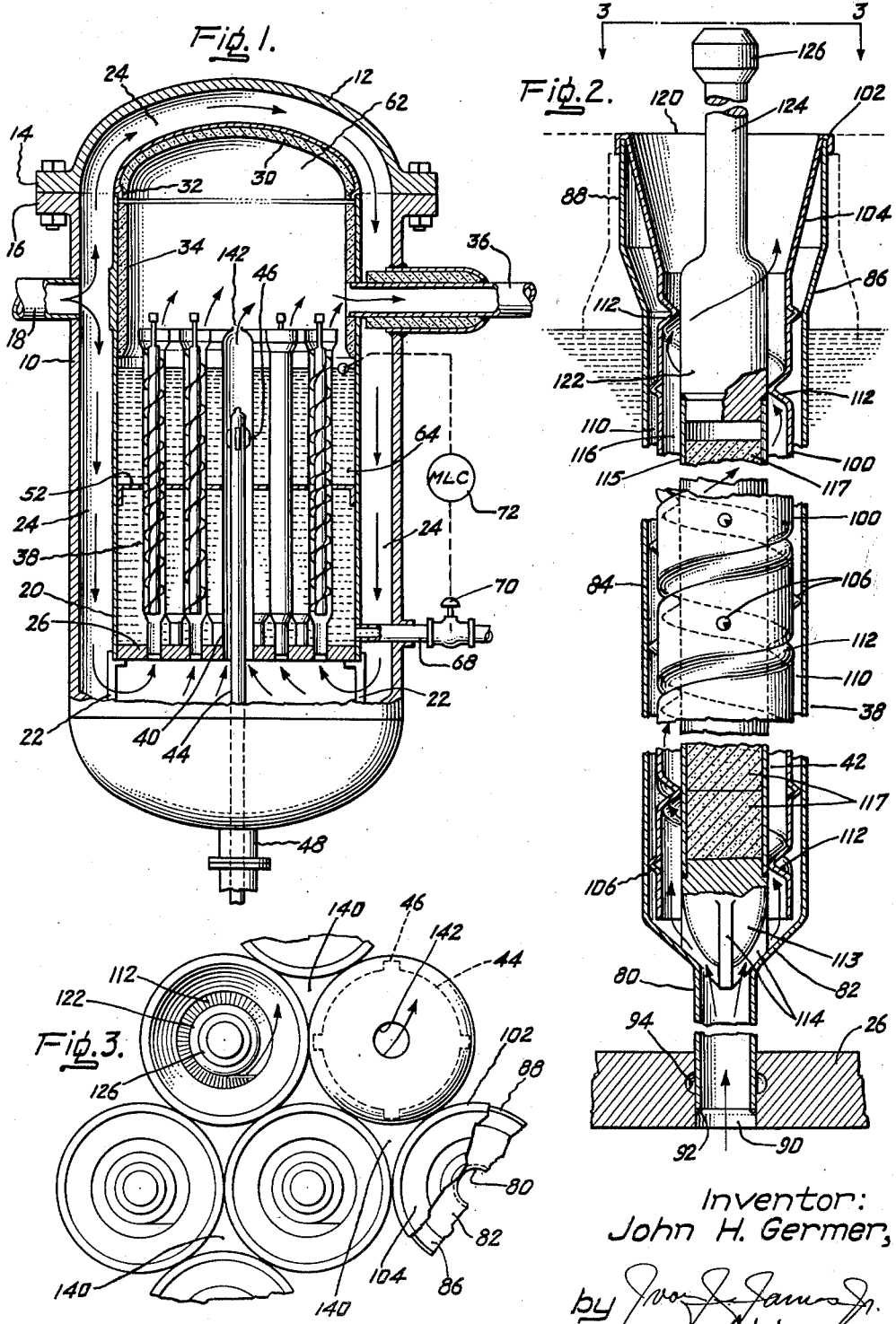

April 16, 1963          J. H. GERMER          3,085,959
LIQUID MODERATED VAPOR SUPERHEAT REACTOR
Filed Jan. 2, 1959          3 Sheets-Sheet 3
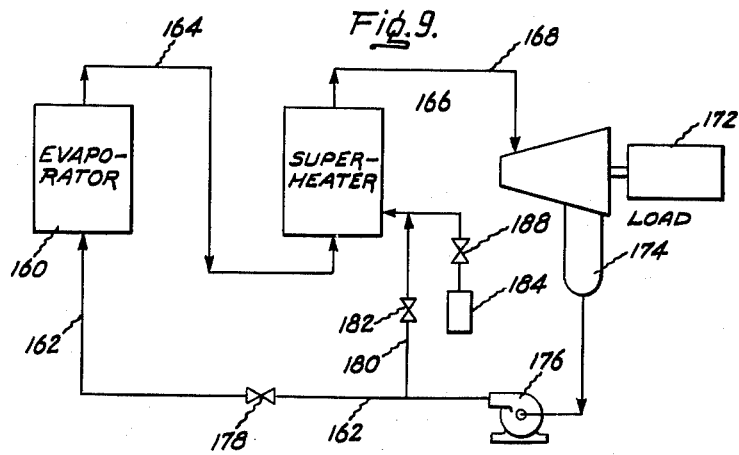
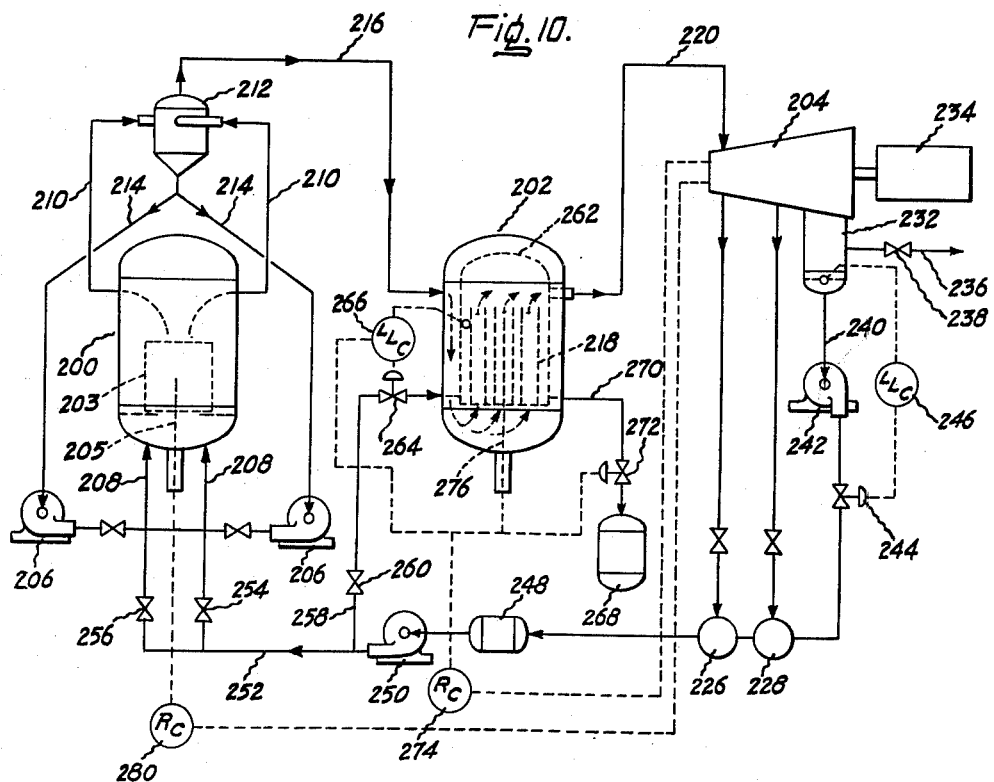
Inventor:
John H. Germer,
by
Attorney.

United States Patent Office 3,085,959
Patented Apr. 16, 1963

3,085,959
LIQUID MODERATED VAPOR SUPERHEAT
REACTOR
John Halbert Germer, San Jose, Calif., assignor to General Electric Company, a corporation of New York
Filed Jan. 2, 1959, Ser. No. 784,763
10 Claims. (Cl. 204—193.2)

This invention relates to the conversion of mass to energy in a gas or vapor cooled nuclear reactor, and it more specifically relates to a new and improved apparatus in which nuclear energy is released in a liquid-moderated vapor superheating reactor for the generation of useful energy.

The release of large amounts of energy through nuclear fission reactions is now quite well known. In general, a fissionable atom, such as $U^{233}$, $U^{235}$, or $Pu^{239}$, absorbs a neutron in its nucleus and undergoes a nuclear disintegration. This produces on the average, two fission products of lower atomic weight and great kinetic energy, and usually two or three neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches about 200 m.e.v. (million electron volts) per fission.

The kinetic energy of the fission products is quickly dissipated in the fuel and other ambient material as heat. If during this fission process there is on the average one net neutron remaining which induces a subsequent fission, the fission reaction becomes self-sustaining and the heat generation is continuous. The heat is removed by passing a coolant through heat exchange relationship with the fuel and a load or heat sink. The reaction may be continued as long as sufficient fissionable material remains in the system to override the effects of the fission products which will be produced during operation.

Useful mechanical or electrical energy can be generated by conversion of the heat energy liberated in the foregoing neutron-induced nuclear fission reactions. This energy generation involves a chain reacting assembly containing nuclear fuel, a coolant passed through heat exchange relationship with the assembly, and control of the coolant flow and the assembly operating conditions to produce, either directly or indirectly, a heated coolant. This coolant is fed to a suitable prime mover to generate the mechanical or electrical energy. Reasonably high thermodynamic energy conversion efficiencies are favored by the delivery of the heated coolant from the chain reacting assembly to the prime mover inlet at as high a temperature as possible. In the usual industrial application, using a heat sink temperature of about 100° F. for example, the lowest feasible coolant inlet temperatures at the prime mover inlet are in most cases in the range of 200° to 300° F., but the conversion efficiencies are quite low. With coolant temperatures in the order of 1500° F., high thermodynamic efficiencies are readily obtained. The use of still higher inlet temperatures to achieve further increases in efficiency is limited primarily by reason of the increased heat losses from the system and the mechanical or chemical properties of the structural materials used in the system.

The high temperature coolant so generated can be used in one or more of the various kinds of prime movers, which are defined herein as devices for converting heat energy to either mechanical or electrical energy or both. They include steam and gas driven reciprocating or rotating machinery such as gas or steam engines, gas or steam turbines, and the like, either with or without mechanically driven electric power generation equipment connected to the prime mover as a load to convert the mechanical energy to electrical energy. Heretofore, steam has been the principal working fluid in such prime movers, and since their thermodynamic efficiencies increase with an increase in the inlet temperature of the working fluid, steam superheating has long been practiced in power plant systems deriving their heat from fossil fuel combustion. In addition to increased efficiency, superheating provides a reduction of condensation within the prime mover and consequently a decrease in erosion problems. Prime mover construction is also considerably simplified.

In the application of several distinct kinds of nuclear reactors to the generation of useful energy, desirable results of working fluid superheating also exist. In a pressurized water reactor, hot water coolant discharged from the reactor is ordinarily passed through an exchanger to form cool water which is returned to the reactor and to generate steam which is delivered to the prime mover. In an organically moderated and cooled reactor, the hot high-boiling organic liquid coolant discharged from the reactor is ordinarily passed through an exchanger to form cool organic liquid which is returned to the reactor and to generate steam which is delivered to the prime mover. In a boiling water reactor, steam is generated in the reactor and can be delivered directly to the prime mover. In a liquid metal-cooled reactor, the hot primary coolant is passed through an exchanger to form a cool primary coolant and a hot secondary metal coolant, the hot secondary liquid metal is passed through a second exchanger ordinarily to evaporate water forming steam which can be delivered to the prime mover. It will be noted that in each of these representative cases, steam is the working fluid which is delivered to the prime mover. In each of these cases, the superheating of this steam will result in improved mechanical or electrical energy generation efficiencies.

The superheating of steam in a nuclear reactor presents distinct problems from those involved in the superheating of steam by fossil fuel combustion. Heat transfer from the nuclear fuel and from the moderator, if used, to the steam coolant is unusual. Thermal stresses in the equipment may be exceptionally high due to the very large temperature differentials which exist over very short distances. The equipment design is extraordinarily complicated due to the necessary provision for reactor refueling, and to prevent operational problems peculiar to the start-up and shutdown of a nuclear reactor.

These and other problems are not encountered in the conventional steam superheaters.

It is an object of this invention to provide an improved nuclear reactor which is moderated by a liquid compatible with the gas phase coolant and which substantially eliminates severe thermal stresses previously encountered in the reactor core support structures of such reactors.

Another object is to provide a nuclear reactor apparatus in which the entire exposed inner surface of the reactor vessel is contacted by at least one fluid having a uniform temperature to eliminate substantially all thermal stresses previously encountered in such vessels.

A further object is to provide an improved nuclear fuel-containing process tube structure for use in nuclear reactors.

Another object is to provide a novel and improved nuclear reactor apparatus for steam superheating.

Other objects and advantages of this invention will become apparent to those skilled in the art as the description and illustration thereof proceed.

Briefly, the present invention comprises an improved nuclear reactor apparatus for the generation of useful mechanical or electrical energy, or both, and which includes a reactor vessel, a transverse core-supporting matrix plate, a plurality of nuclear fuel-containing process tubes, means for maintaining a body of liquid neutron moderator around said tubes to form a chain-reacting nuclear assembly, and means for passing therethrough a gas phase coolant which is compatible with and introduced at the same temperature as that of the moderator. The vessel and matrix plate structure is adapted to be maintained in contact on all exposed internal surfaces with at least one fluid of uniform temperature thereby substantially eliminating thermal stresses. The invention also includes an improved insulated nuclear fuel-containing process tube structure providing locally increased heat transfer coefficients to reduce maximum fuel element surface temperatures.

The nuclear reactor and the fuel containing process tube structure of this invention will be more readily understood by reference to the following detailed description including the accompanying drawings in which:

FIGURE 1 is a vertical cross-section view of the liquid-moderated vapor superheating nuclear reactor which is one embodiment of this invention;

FIGURE 2 is a vertical cross-section view showing the detail of one modification of the insulated fuel-containing process tube structure according to this invention;

FIGURE 3 is a plan view of part of a reactor core containing fuel-containing process tubes as shown in FIGURES 1 and 2;

FIGURE 4 is a transverse cross-section view of a part of the same core as in FIGURES 1 and 2 taken at a lower level in the core;

FIGURE 5 is a plan view showing the upper ends of another embodiment of the process tubes according to this invention;

FIGURE 6 is a vertical cross-section view of another embodiment of the liquid moderated vapor superheating nuclear reactor of this invention;

FIGURE 7 is a cross-section elevation of a modified fuel-containing process tube according to this invention and as employed in the reactor of FIGURE 6;

FIGURE 8 is a partial cross-section view showing the radial guides for the process tubes in the core of the reactor shown in FIGURE 6;

FIGURE 9 is a simplified block diagram of an energy generation process in which this invention is useful; and FIGURE 10 is a detailed flow diagram of such an energy generation process.

The following description of FIGURES 1 and 2 is conducted in terms of a specific example of the liquid-moderated vapor superheating nuclear reactor of the present invention using liquid natural water as the moderator and natural steam as the coolant fluid. By "natural" as applied to the water and steam herein is meant the natural isotopic mixture.

Referring now more particularly to FIGURE 1 which shows a first embodiment of the reactor of this invention, reactor pressure vessel 10 is provided with removable head 12 connected by means of flanges 14 and 16. One or more coolant vapor inlets 18 for saturated steam open into vessel 10 as shown. The pressure vessel is carbon steel with a wall thickness of 5.25 inches, an inside diameter of 9.5 feet, and a height of 30 feet. The vessel is internally clad with 0.5 inch of type 304 stainless steel. Inner or core vessel 20 is supported by means of supports 22 substantially coaxially within pressure vessel 10 leaving open coolant inlet region 24 between the adjacent vessel walls. The core vessel is a cylindrical type 304 stainless steel tank 8.5 feet in outside diameter, 20 feet high, and has a wall thickness of 0.75 inch. It is provided at its lower end with a matrix plate 26 which is also type 304 stainless steel and which is 5 inches thick.

Core vessel 20 is provided at its upper end with a removable head 28 provided with internal insulation 30. Head 28 is connected at 32 with the upper rim or edge of core vessel 20. This connection is preferably machined to resist leakage but is not necessarily sealed to prevent leakage. As subsequently decribed, the pressure differential across the reactor core tends to seal this connection. Insulation 34 is also provided around the inside surface of the upper part of core vessel 20 down to a level in the vicinity of the upper end of the core. Core vessel 20 is further provided with at least one coolant outlet 36 through which the superheated steam is removed through the wall of pressure vessel 10.

Extending upwardly from matrix plate 26 is a plurality of parallel open-ended fuel-containing process tubes 38 and control poison-containing process tubes 40 arranged in a triangular lattice, although square or other lattices may be used. Tubes 38 each contain a fuel element 42 more fully described in connection with FIGURE 2. Tube 40 contains reciprocable control poison element 44, here shown as an elongated solid rod provided with guides 46 at its upper end. This control element extends through an inlet 48 at the bottom of reactor vessel 10 from a control element drive mechanism, not shown, but well known to those skilled in the art. The control elements may also be inserted from the top of the core with suitable modifications if desired. The embodiment shown entering from the core bottom is preferred, however. As indicated, tubes 38 and 40 are all open at their upper and lower ends to permit a flow of steam coolant therethrough in the direction indicated by the arrows. The major portion of the steam flows through the fuel-containing process tubes 38, cools the fuel elements 42, and thereby becomes superheated. The minor portion of the steam flows through the control poison-containing process tubes 40 to cool the control element and dissipate heat generated therein. About 95 percent of the steam flows through tubes 38, and about 5 percent flows through tubes 40.

As indicated in FIGURE 1, a helical steam flow path is provided by means of helix 50 in the space immediately adjacent the surface of each fuel element 42. An important feature of the present invention involves the variation of the helix angle with distance along the length of a given fuel element, and the variation of helix angle with radial position of the fuel element in the reactor core. For purposes of the present description, the helix angle is defined as the angle between a line drawn tangent to the helix at a particular point and a line drawn parallel to the axis of the helix through the same point. Along the active length of each fuel element 42, the helix angle first increases with distance from the inlet and then decreases with distance toward the outlet end. In other words, the helix is "tighter" and has a greater number of turns per unit of axial length in those regions of the fuel element where the fuel surface temperatures tend to be the highest. The fuel element surface temperature is the sum of the coolant fluid temperature in the process tube, which is maximum at the outlet, and the temperature drop in the coolant fluid film, which is maximum near the fuel element midpoint. Therefore, these maximum fuel surface temperatures have been found to exist between the midpoint and the outlet end of the fuel element. With the axial active length of the fuel element defined as L measured in a straight line along the fuel element from the coolant inlet end, the helix angle is made to reach a maximum preferably between about 0.6L and 0.9L to provide relatively higher heat transfer coefficients in this region than in the other regions of the fuel element to reduce substantially the maximum fuel surface temperatures.

Further, in this embodiment of the process tube structure, the helix angle is also dependent upon the radial position of the particular fuel-containing process tube in the core. The helix angles are generally lower, that is the helices are not as "tight," and the heat transfer coefficients are higher in tubes which are closer to the longitudinal axis or centerline of the core than they are at corresponding points in the tubes at or near the core periphery, although the helix angle in all the fuel-containing tubes first increases and then decreases with distance in the manner described along the length of the fuel element in the coolant flow direction.

For example, in the vapor superheating nuclear reactor of this specific example, the helix angle in the fuel-containing process tubes at the periphery of the core increases from 40° at the inlet end to about 70° at a point about 0.75L and then decreases to about 60° at the outlet end. In the centermost tubes, this helical angle first increases from about 15° at the outlet end to about 45° at a point about 0.75L and then decreases to about 30° at the outlet end. These longitudinal and radial variations in helix angle are indicated generally in FIGURE 1. The helix angles for the remaining tubes in intermediate positions in the core are intermediate the values given above.

By employing the fuel-containing process tubes having these axial and radial variations in helix angle according to this invention, the steam flow rates are relatively higher in the tubes nearer the core center and lower in the peripheral tubes whereby the fuel elements all operate, regardless of the position in the core, with substantially the same surface temperatures at corresponding points along their lengths. The maximum fuel surface temperatures in the core are hereby substantially reduced.

Fluid permeable process tube guides 52, having fluid flow openings, not shown, are provided at one or more intermediate levels in the core between matrix plate 26 and the top of the process tubes to prevent lateral movement of the tubes in this middle region.

In FIGURE 1, the saturated steam coolant at 549° F. and 1025 p.s.i.a. enters inlet 18 and fills the more or less annular coolant inlet region 24 existing between core vessel 20 and pressure vessel 10. All exposed surfaces of core vessel 20, matrix plate 26, and pressure vessel 10 are thus contacted by a fluid of substantially uniform temperature, specifically the inlet coolant steam at its saturation temperature. Thermal stresses otherwise induced in these elements are substantially eliminated.

The saturated steam flows from below core vessel 20 upwardly along the helical paths in each of the fuel-containing process tubes 38 generating a pressure differential in the order of 50 p.s.i. and is discharged in superheated condition into outlet plenum 62. The saturated steam pressure in coolant inlet zone 24 is about 1025 p.s.i.a. while the pressure of superheated steam in plenum 62 is about 975 p.s.i.a. This pressure differential acts inwardly and forcefully sets head 28 at connection 32 and either minimizes or eliminates the leakage of saturated steam flow from annulus 60 into plenum 62.

A body of liquid natural water as moderator 64, having upper liquid level 66, is maintained around the tubes 38 and 40 and forms a nuclear chain reacting assembly. Moderator inlet and outlet 68 controlled by valve 70 is provided. A modulator level controller 72 senses the moderator level and actuates valve 70 to maintain the desired moderator level and make up for moderator vaporization induced by heat absorbed in the moderator from the superjacent superheated steam plenum 62, gamma ray heating of the moderator, heat loss from the process tubes, and the like. The liquid moderator is thus maintained by the balance of this heat absorption and vaporization processes at substantially the saturation temperature. Thus the fluid temperatures above and below matrix plate 26 are substantially equal and thermal stresses otherwise induced in this structure eliminated or greatly reduced.

The reactor fuel is $UO_2$ of at least 95 percent of its theoretical density and having an enrichment of 2.50 percent $U^{235}$. It is contained in approximately 5,700 cylindrical fuel elements, each having an active length of 80 inches, and supported in process tubes spaced apart in a triangular array on 1.100 inch centers. The fuel elements are provided with a stainless steel cladding. The volumetric water to fuel ratio is 1.55. There are 517 control poison-containing process tubes 1.13 inches in diameter each containing a stainless steel clad boron carbide filled control rod 1.00 inch in diameter. These control rods are ganged in groups of about seven each so that 73 control rod drives are required. The total uranium dioxide fuel contained in the reactor is 45,000 pounds and the thermal rating of the reactor core is 130 megawatts. The steam coolant rate is 1.6 million pounds per hour, the steam temperature rising from 549° F. to 850° F. in passing through the reactor core.

Referring now to FIGURE 2, a vertical elevation cross-section view of the fuel-containing process tube of FIGURE 1 is shown. In this view, process tube 38 is open at both ends and is supported in a fluid-tight seal only at its lower end on matrix plate 26. A lowermost cylindrical section 80, a lower downwardly tapering fuel support section 82, an intermediate cylindrical section 84, an upper transition section 86, and a collar section 88 make up the process tube 38 which is about 170 inches long. The lowermost cylindrical section 88 is about 30 inches long, is fitted into opening 90 in the matrix plate, and is welded at 92. The only fluid-tight sealed support for tube 38 is at 92 where it is welded or otherwise sealed into the plate. A peripheral groove 94 in the wall of opening 90 is provided to permit the lower cylindrical section 80 of the process tube to be rolled into the matrix plate. This may be necessary to permit repair of a leaking tube-matrix plate connection. The process tube is type 304 stainless steel.

Disposed coaxially within process tube 38 is an insulation tube 100 which is attached by means of a fluid-tight seal only at its upper end 102 to the corresponding end of tube 38 and is provided with transition section 104. The coaxial relation of insulation tube 100 and process tube 38 is maintained by means of a plurality of outward projections 106 distributed more or less uniformly over the surface of the insulation tube and which extend into contact with the inner surface of process tube 38. An outer or insulation annulus 110 open at its lower end is hereby provided between process tube 38 and insulation tube 100 and in operation it is filled with a static layer of steam as the insulating medium.

The helical coolant steam flow path 50 generally indicated in FIGURE 1 is induced in the structure of this invention by means of an inwardly projecting helical depression or groove 112 in the wall of insulation tube 100. Fuel element 42 slides coaxially into insulation tube 100 and is supported therein by elements 114 resting on support section 82 of the process tube. Inner annulus 116 is thus formed. The helical projection 112 extends into contact with and prevents lateral movement of the fuel element and defines the helical steam flow path through annulus 116. Saturated steam enters opening 90 at 549° F., passes upwardly around the lower end of fuel element 42, maintains in outer annulus 110 the insulating layer of static steam, flows in a helical path of non-uniform helix angle as previously described through inner annulus 116 in direct heat exchange relationship with fuel element 42, and then discharges outwardly through the upper open end of the process tube. The insulation tube 100 is fabricated of type 304 stainless steel.

Fuel element 42 is provided with lower solid shield section 113 having support elements 114, an elongated hollow active fuel or clad section 115 containing fuel pellets 117, a solid upper end and shield section 122 provided with extension 124, and handling knob 126. Shield section 122 is about 30 inches in length, extension section is about 15 inches long and 0.40 inch in diameter, and these are fabricated of type 304 stainless steel. The 30 inches of liquid moderator above the end of the active fuel and the solid shield section 122 provide a substantial amount of attenuation of the vertical radiation from the fuel element.

Following is a tabulation of the radial dimensions and thicknesses of the various parts of a fuel-containing process tube of FIGURE 2.

TABLE I

*Radial Dimensions of Fuel-Containing Process Tube Structure*

| | Inches |
|---|---|
| Fuel pellet plus gap, radius | 0.280 |
| Fuel clad, thickness | 0.020 |
| Fuel element, outer radius | 0.300 |
| Inner annulus, thickness | 0.120 |
| Insulation tube, inner radius | 0.420 |
| Insulation tube, thickness | 0.010 |
| Insulation tube, outer radius | 0.430 |
| Outer annulus, thickness | 0.030 |
| Process tube, inner radius | 0.460 |
| Process tube, thickness | 0.020 |
| Process tube, outer radius | 0.480 |

Referring now more particularly to FIGURE 3, a plan view of a part of the top of the reactor core shown in FIGURE 1 is shown indicating a control poison-containing process tube 40 and three adjacent fuel-containing process tubes 38. The handling knob 126 of each fuel element, and the inner surface of insulation tube 100 and its upper transition section 104 appear. The triangular lattice arrangement is apparent, but other lattices may be substituted. The upper enlarged collar sections 88 of the individual process tubes 38 are shown extending into direct contact with one another to prevent any substantial lateral movement of the upper ends of the process tubes and maintain the desired core lattice or fuel element spacing. Regions in FIGURE 3 indicated as 140 are the open spaces between the adjacent process tube collars 88 and through which vaporized moderator escapes into super-heated steam plenum 62 shown in FIGURE 1. Indicated in FIGURE 3 by broken lines is control poison element 44. The upper outlet orifice 142 of control poison-containing process tube 40 is shown. The size of this orifice is determined by the magnitude of the pressure drop of steam flowing through the core and the desired flow rate of steam through each such process tube 40 to effect the necessary cooling and yet avoid excessive by-passing of steam through the core. This orifice is 0.125 inch in diameter in the instant example.

In FIGURE 4 is shown a transverse cross-section view of the same group of process tubes 38 and 40 taken at a lower level in the reactor core. Here tube 40 is shown containing control element 44 having an external jacket 144. In this example, the control poison is boron carbide ($B_4C$) contained in a 0.030 inch thick stainless steel jacket. The control element is 1.000 inch in outside diameter. In the remaining portions of FIGURE 4 are shown process tubes 38 containing insulation tube 100 and fuel element 42 provided with cladding 115 surrounding fuel pellets 117. The outwardly extending projections 106, serving to maintain outer annulus 110, and a single inwardly projecting helical depression 112, serving to maintain inner annulus 116, are also shown. If desired, plural helices may be employed.

FIGURE 5 is a plan view of the top surface of a reactor core similar to that shown in FIGURE 3 with the exception that the upper collars 152 of process tubes 38 are hexagonal rather than cylindrical. These modified collars have vertical indentations 154 at the collar apices, three of which indentations coincide with corresponding indentations of the adjacent hexagonal collars forming the openings 150. In this manner, the open area for moderator vapor flow from the liquid moderator level into superheat plenum may be fixed at a value which is sufficiently small to reduce to negligible values the back heating of the moderator by the superjacent superheated steam in plenum 62 and to prevent the flow of vaporized moderator from generating excessive pressure differentials in passing from the moderator region into the superheated steam plenum.

Referring now more particularly to FIGURE 6, a second embodiment of the liquid-moderated vapor-superheating nuclear reactor according to this invention is shown. This embodiment differs from that shown in FIGURE 1 in that it does not contain the separate outer pressure vessel and inner core vessel. It incorporates however, the same essential structural features which minimize thermal stresses in the matrix plate and the pressure vessel. In the following description, similar equipment items which are also shown in FIGURE 1 are designated here by the same numerals with primes added; for example, vessel head 12 and 12'.

A single vessel 156 is provided with removable head 12', connected by means of flanges 14' and 16'. At the bottom of the vessel, provision is made at 48' for introducing a reactor control element 44'. Near the bottom of the vessel is provided a transverse matrix plate 26' which supports the reactor core made up of a plurality of parallel open-ended spaced fuel-containing process tubes 38'. Control poison-containing process tubes are not shown here, but are employed as indicated in FIGURE 1.

In FIGURE 7 an enlarged view of modified process tube 38' including a modified insulation tube 100' is shown which is provided with an intermediate region of reduced diameter extending between about 0.6L and 0.9L, as defined above, thereby providing a relatively reduced coolant flow area, increasing the heat transfer coefficient in this region, and reducing fuel element surface temperatures in this region as described previously. This reduction in area is greatest in process tubes at the periphery of the core, and least in those at the core center to vary the heat transfer coefficients with radial position in the core and reduce maximum fuel surface temperatures as previously described. Projections 106' extend outwardly and projections 107' extend inwardly from insulation tube 100' to maintain the inner and outer annuli 110' and 116' and the desired spacing of fuel element 42', insulation tube 100', and process tube 38'.

Referring again to FIGURE 6, the body of liquid natural water moderator 64' surrounds the process tubes 38' and has an upper liquid level 66' just below the upper ends of tubes 38'. In this modification, the process tubes are not provided with the enlargements or collars at their upper ends, but are maintained in fixed parallel positions by means of fluid permeable process tube guides 158. These guides may permit vertical movement of the process tubes caused by thermal expansion and contraction, but in any event are constructed to prevent any substantial radial or lateral movement of the tubes and thus maintain the desired reactor lattice and fuel element spacing. As in the modification of FIGURE 1, the process tubes are sealed with a fluid-tight seal only at their lower ends where they join matrix plate 26'.

In the upper end of vessel 156 is provided an insulated shell 157 having a lower open end and closed at its upper end by removable upper head 159 which rests at joint 32' and forms jacket 161. The shell 157 and head 159 are provided on their inner surfaces with insulating layer 30' extending down to a point adjacent liquid level 66', and sufficiently thick to prevent unduly large heat transfer at temperature drops equal to the degree of superheating of the coolant stream.

A saturated steam coolant inlet 18' opens into vessel 156 at a point below matrix plate 26', the steam passes upwardly through and is superheated in the various process tubes 38', collects in superheated steam plenum 62', and is removed therefrom by means of superheated steam outlet 36'. The matrix plate is thus exposed on its lower surface to inlet steam at the saturation temperature and on its upper surface to liquid water moderator at the saturation temperature. The thermal stresses in the matrix plate are hereby reduced to the minimal values which result from the normal gamma ray heating.

Thermal stresses in the reactor vessel 156 are also minimal since it is contacted by fluids at the saturation temperature throughout its entire internal exposed surface. These fluids include the liquid moderator water at its saturation temperature in the central part of the vessel, the inlet saturated steam in that region below matrix plate 26, and saturated steam throughout the area above the moderator level. A small flow of saturated inlet coolant steam is introduced into steam jacket 161 between heads 12′ and 159 through line 163 at a rate controlled by valve 165 to maintain the upper area of the reactor vessel at saturated steam temperature. This flow of steam may be allowed to leak into plenum 62′ through joint 32′, or pass through a separate opening 167 provided for that purpose, or if desired, it may be removed from vessel 156 by conventional outlet means not shown from the opposite side of jacket 161. Jacket 161 thus comprises a form of temperature control means for the upper end of the reactor vessel. The reactor vessel 156 is thus maintained at isothermal conditions minimizing thermal stresses otherwise induced in the vessel.

In FIGURE 8 appears a partial transverse section view of the reactor core of FIGURE 6. Fuel elements 42′ are shown enclosed in fuel-containing process tubes 38′ arranged in a triangular lattice. Process tube guides 158 are shown in the form of a mesh or screen having hexagonal openings through which the process tubes extend. The guides may be integrally connected to one another to assure rigidity. They are supported by conventional means, not shown, to the matrix plate or to the inner surface of pressure vessel 156, or the like. The guides need not be integrally connected to the outer surface of process tubes 38′ thus permitting free longitudinal or axial movement of the process tubes while preventing radial or lateral displacement. This form of process tube guide means has large open areas through which the body of liquid moderator may circulate readily and through which may pass the bubbles of moderator water vapor which form during operation of the reactor and serve to maintain the moderator at a substantially constant saturation temperature. It should be understood that this form of process tube guide means is representative only, and that other forms may be substituted so long as lateral movement of the process tubes is prevented, and openings are provided for the movement of the moderator fluid through the guide means.

Referring now to FIGURE 9, a simplified block diagram is given of the several essential elements in the power generation process and apparatus of this invention. Evaporator or steam generator 160 is supplied with feedwater through line 162 and delivers saturated steam by means of line 164 to the steam superheating nuclear reactor 166 of this invention. Superheated steam is delivered through line 168 to a prime mover load, indicated here as steam turbine 170 driving an electric generator 172. Exhaust steam is condensed in condenser 174 and the condensate is returned to the evaporator by means of pump 176 through line 162 at a rate controlled by valve 178. As previously indicated, heat absorption by the liquid moderator in the superheating reactor 166 causes gradual evaporation. Accordingly, liquid moderator make-up line 180, corresponding to line 68 in FIGURE 1, and controlled by valve 182, is provided to maintain a predetermined liquid level of moderator in reactor 166. However, in the event that an excessive quantity of moderator should accumulate in the superheating reactor, or in the event of a necessity to shut down the reactor quickly, moderator dump tank 184 is provided connected by means of line 186 and valve 188 to the core vessel. In an emergency, valve 188 is opened and either gravity or the pressure of superheated steam present in reactor 166, or both, rapidly discharges the moderator into tank 144 shutting down the reactor. The decay heat liberated in the fuel may be absorbed by a slow flow of steam through the reactor from the evaporator 160, whether the moderator has been dumped or not.

Referring finally to FIGURE 10, a detailed process flow diagram of a mechanical or electrical energy generation system according to this invention is shown. The system includes a boiling water cooled and moderated reactor 200 serving as the evaporator or steam generator, a liquid-moderated steam superheating reactor 202 according to this invention, and a steam turbine load 204. The physical and structural details of the steam superheating reactor 202 have been given previously in the description of FIGURES 1 and 2. The boiling water reactor or evaporator 200 is contained in a vessel 12.5 feet in diameter, 41.8 feet in height, having a 5.25 inches wall thickness, and clad with 0.25 inch thick type 304 stainless steel over its entire internal surface. The nuclear fuel is uranium dioxide ($UO_2$) having at least 95 percent of theoretical density and having an enrichment of 1.50 percent $U^{235}$. The fuel is made up of cylindrical pellets contained in a Zircaloy tube 0.030 inch in wall thickness and 0.562 inch in outside diameter. The fuel rods are spaced 0.79 inch center to center with 144 such rods in a square 12 by 12 assembly, each assembly being contained in a square flow channel 9.7 inches on a side. The fuel assemblies are 13.9 feet long. The core is made up of 89 such fuel assemblies, spaced side by side forming a core, which fits within a 9.9 foot diameter circle. Eighty cruciform control rods of boron (2 percent) steel are employed to control the reactor. The volumetric water to uranium dioxide ratio is 2.1 and 57.7 tons of uranium dioxide fuel are contained in the core. The thermal rating of this core is 658 megawatts. Demineralized natural water coolant is recirculated through the core at a rate of 34 million pounds of water per hour entering the core at 527° F., and discharging from the core saturated and partially vaporized at a temperature of about 555° F. at an operating pressure of 1050 p.s.i.a. The steam generation rate is 1.6 million pounds per hour.

In FIGURE 10, evaporator 200 is shown containing core 203, provided with typical control rod 205. Coolant is delivered by pumps 206 through lines 208 into the core and a mixture of steam and water discharges upwardly through lines 210 into steam-water separator 212. Vaporized water is returned from the separator through lines 214 and is returned by pumps 206 for re-heating in core 203.

Saturated steam is delivered from separator 212 by means of steam line 216 at a temperature of about 550° F. into the saturated steam annulus of superheating reactor 202. The detailed structure of this particular superheating reactor has been previously described in detail and illustrated in FIGURES 1-4 although the embodiment shown in FIGURES 5-8 may also be used. The steam passes upwardly through the superheating reactor core 218 and is discharged at a temperature of about 850° F. through superheated steam line 220 into steam turbine 204. Extraction steam is withdrawn from the intermediate stages of turbine 204 through lines 222 and 224 and is introduced respectively into heaters 226 and 228. Condenser 232 condenses exhaust steam at an absolute pressure of 1.0 inch mercury. Line 236 controlled by valve 238 opens from the condenser and permits the removal of noncondensible gases from the steam circuit. Generator 234 rated at 260 megawatts electrical, is driven by turbine 204.

Condensate is removed through line 240 by means of pump 242 at a rate controlled by valve 244 in accordance with liquid level controller 246. This condensate is passed through feedwater heaters 226 and 228 and through deaerator and feedwater demineralizer 248 into feedwater pump 250. The main portion of the feedwater is pumped through line 252 controlled by valves 254 and 256 at a temperature of about 527° F. into the bottom of reactor vessel 200. A minor portion of the feedwater passes as moderator make-up through line 258 into core vessel 262 in superheating reactor 202. This liquid moderator make-up flows at a rate of about 50,000 pounds per hour controlled by valve 260 and liquid level controller 266 to make up moderator evaporation losses in the superheater. Reactor dump tank 268 is provided to receive hot moderator quickly from inner vessel 262 through line 270 controlled by valve 272 in the event of an emergency shutdown.

Superheating reactor 202 is provided with reactor controller instrument 274 which is responsive to the turbine load 204 placed on the system. In the event of an emergency, instrument 274 closes valve 264 terminating moderator makeup, opens valve 272 discharging the liquid moderator from the reactor, and runs control rods 276 into the core thereby shutting down steam superheating reactor 202. Similarly, the boiling water reactor 200 is provided with reactor controller 280 which is responsive to the load and which functions to drive typical control rod 205 into the core 203 thereby reducing power in this reactor. A continuation of steam flow through pipe 216 provides shutdown cooling of both the boiling reactor 200 and superheating reactor 202.

In the complete system just described, the over-all thermal efficiency of the process is about 33 percent, whereas the thermal efficiency of the boiling water reactor 200 directly coupled to a 185 mw. (e) turbine load is only about 28 percent. The system of this invention is free from the thermal stresses characteristic of previous liquid-moderated steam superheating reactors, due to the uniformity of steam and water temperatures in contact with the matrix plate and the reactor vessel.

It should be understood that various modifications may be made in this invention without departing from the spirit or scope of the accompanying claims. The foregoing description has been by way of several specific embodiments of this invention as a natural water-moderated steam-superheating reactor using slightly enriched $UO_2$ fuel. The steam superheating reactor of this invention may be applied to the superheating of steam produced from any steam generator whether fossil fuel fired or heated by nuclear fuel. Further, the prime mover used to convert the heat energy may be such as to deliver reciprocating or rotating mechanical energy as well as to drive a generator to deliver electrical energy.

Nuclear fuel suitable for use in the nuclear reactor components of the present invention may include the fertile isotopes of uranium, plutonium, or thorium, and any others which are readily available, as well as the fissionable isotopes $U^{233}$, $U^{235}$, $Pu^{239}$, and any others which are available. The fertile and fissionable fuels may be employed in elemental form as the metals, or as mixtures of metals such as the alloys, or as chemical compounds such as the oxides, carbides, nitrides, silicides, borides, (if burnable poisons are to be used) and the like.

As the control poison elements, various nuclear reaction poisons may be used such as boron, cadmium, gadolinium, silver, dysprosium, samarium, europium, halfnium, mercury, and other known elements having high non-fission neutron capture cross-section. These nuclear poisons may be used in solid, semisolid, or as liquids in molten or solution form. Further, they may be employed in elemental, mixture or compound form.

As structural materials in the apparatus of this invention, such materials as stainless steel, aluminum and its alloys, zirconium and its alloys, and nickel and its alloys may be used.

It is also contemplated in this invention to substitute heavy water ($D_2O$) as the moderator and the reactor coolant. The reactor lattice is modified in such cases to increase the center to center spacing of the fuel elements.

The process and apparatus of this invention may also utilize other neutron moderating liquids and other gas phase coolants so long as the liquid and the vapor are compatible, that is, do not undergo reaction with and are readily separable from one another. For example, the organic liquid moderators, such as diphenyl, diphenyloxide, the isomeric terphenyls, and other high-boiling hydrocarbon compounds are efficient neutron moderators and they may be substituted for the liquid water moderator described in this invention. Water vapor or steam is compatible with such organic liquids and it may therefore be used as the reactor coolant and working fluid. Some organic moderator may vaporize in the superheating reactor, but the resultant mixed vapors will condense in the turbine condenser where the immiscible liquids which form may be separated and returned to appropriate points in the system. The low-boiling saturated normally gaseous or readily vaporizable thermally stable hydrocarbons such as methane, ethane, propane, and the higher molecular weight normal and isomeric paraffins having up to about eight carbon atoms per molecule are also compatible with the various known organic moderator liquids, as well as water, and may be used as coolant and working fluids in the process and apparatus of this invention instead of steam. The coolant vapor inlet temperature is separately controlled so as to be substantially equal to the equilibrium temperature of the liquid moderator in such cases. Where the liquid moderator and the working or coolant fluid are the liquid and gaseous phases of same material, this equality of temperature at the saturation value is attained without separate temperature control. The essential requirement in any case is that the liquid moderator be the same as or compatible with the gas or vapor used as the coolant and working fluid in cooling the nuclear superheating reactor of this invention.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. A nuclear steam superheating reactor apparatus which comprises a reactor vessel, a matrix plate disposed transversely near the lower end of said vessel, a plurality of parallel nuclear fuel-containing process tube structures spaced apart from one another and open at both ends to permit steam flow therethrough and provided with a fluid-tight sealed support only at their lower ends at said matrix plate, a body of liquid water as neutron moderator disposed above said plate and around said fuel-containing process tube structures to form therewith a nuclear chain reacting assembly, a water inlet opening into said body, an inner vessel disposed with said reactor vessel and surrounding and forming a superheated steam plenum above the upper ends of said plurality of process tube structures, said inner vessel extending downwardly at least into contact with the body of water moderator, at least one steam inlet opening into said reactor vessel connected in steam delivery relation to the lower surface of said matrix plate and the inlet openings of said process tube structures, and at least one superheated steam outlet opening from said inner vessel through said reactor vessel, said body of water being in steam delivery relation to the superheated steam plenum formed at the upper end of said inner vessel through openings between the upper ends of said process tube structures.

2. An apparatus according to claim 1 wherein said body of liquid water is water of the natural isotopic mixture of $H_2O$ and $D_2O$.

3. An apparatus according to claim 1 wherein said body of liquid water is substantially pure heavy water ($D_2O$).

4. A nuclear reactor apparatus according to claim 1 wherein said parallel spaced apart process tube structures are provided with enlarged portions at their upper ends and project into direct contact at this point with one another to prevent any substantial lateral relative movement of said tube structures to maintain the desired fuel element spacing and to inhibit back-heating of said body of water by the superjacent superheated steam.

5. A nuclear reactor apparatus according to claim 1 wherein said fuel-containing process tube structures each comprise an outer process tube, an insulation tube therein attached by means of a fluid-tight seal at only one end to the corresponding end of said outer process tube and spaced by means of a plurality of outward projections of said insulating tube coaxially apart from the inner wall of said outer process tube forming therebetween an outer annulus which communicates with the steam flow, and an elongated nuclear fuel element disposed within said insulation tube and spaced by means of at least one inward projection of said insulating tube coaxially apart from the inner wall thereof forming an inner annulus for said steam flow.

6. A nuclear steam superheating reactor apparatus which comprises a reactor vessel, a matrix plate disposed transversely near the lower end of said vessel, a plurality of parallel open-ended nuclear fuel-containing process tube structure disposed vertically and spaced apart from one another within said vessel and provided with a fluid-tight sealed support only at their lower ends to said matrix plate, a body of liquid water as neutron moderator disposed above said plate and around said tube structures to form therewith a nuclear chain reacting assembly, a water inlet opening into said body, an inner shell open at its lower end disposed coaxially within the upper end of said reactor vessel and extending downwardly to its lower open end disposed below the upper level of said body of water moderator and providing an annular jacket region between said shell and said vessel and surrounding and forming a superheated steam plenum within said shell above the upper ends of said process tube structures, at least one steam inlet opening into said reactor vessel connected in steam delivery relation to the lower surface of said matrix plate and the inlet ends of said process tube structures, at least one other steam inlet opening into said reactor vessel connected in steam delivery relation to annular jacket region, and at least one superheated steam outlet opening from said superheated steam plenum in inner shell through said reactor vessel, said body of water being in steam delivery relation to said superheated steam plenum within said inner shell through openings between the upper ends of said process tube assemblies.

7. A nuclear steam superheating reactor apparatus which comprises an outer vessel, an inner vessel supported within and spaced apart from the inner wall of said outer vessel, a matrix plate disposed transversely at the bottom of said inner vessel forming a steam inlet region between said vessels and below said matrix plate and a superheated steam plenum in the upper region of said inner vessel, a plurality of parallel open-ended nuclear fuel-containing process tube structures disposed vertically and spaced apart from one another within said inner vessel and provided with a fluid-tight sealed support only at their lower ends to said matrix plate, a body of liquid water as neutron moderator disposed above said plate and around said tube structures to form therewith a nuclear chain reacting assembly, a water inlet opening into said inner vessel, at least one steam inlet opening into said outer vessel connected in steam delivery relation to said coolant inlet region, and at least one superheated steam outlet opening from said superheated steam plenum of said inner vessel through said outer vessel, said body of water being in steam delivery relation to said superheated steam plenum through openings between the upper end of said process tube assemblies.

8. A nuclear fuel-containing process tube structure for use in nuclear reactors, which structure comprises an elongated outer process tube open at both ends, an insulation tube disposed within and attached by means of a fluid-tight seal at only one end to the corresponding end of said outer process tube and spaced coaxially apart from the inner wall of said outer process tube by means of a plurality of outward projections of said insulating tube, and an elongated nuclear fuel element disposed within said insulation tube and spaced coaxially apart from the inner wall thereof by means of at least one inward projection of said insulating tube, and insulation tube being shaped with respect to the surface of said fuel element to provide therebetween a passage for coolant fluid flow whose cross sectional area open to fluid flow adjacent that portion of said fuel element between about 0.6L and about 0.9L which is low relative to the area open to fluid flow adjacent the remaining portions of said fuel element, wherein L is the active length of said fuel element measured in a straight line along said element from the coolant inlet end of said fuel element.

9. A nuclear fuel-containing process tube structure according to claim 8 wherein the diameter of said insulation tube in the region from about 0.6L to about 0.9L is reduced relative to the diameter of the remainder of said insulation tube.

10. A nuclear fuel-containing process tube structure according to claim 8 wherein said insulation tube is provided with an inwardly projecting helical groove extending into contact with the outer surface of said fuel element forming a helical coolant flow path, the helix angle of which increases with distance in the coolant flow direction from the coolant fluid inlet end of said structure to a minimum value in the region of from about 0.6L to about 0.9L and then decreases toward the coolant fluid outlet ends of said structure.

References Cited in the file of this patent

UNITED STATES PATENTS

| 2,708,656 | Fermi et al. | May 17, 1955 |
| 2,778,792 | Szilard | Jan. 22, 1957 |
| 2,782,158 | Wheeler | Feb. 19, 1957 |
| 2,787,593 | Metcalfe | Apr. 2, 1957 |
| 2,806,820 | Wigner | Sept. 17, 1957 |
| 2,832,733 | Szilard | Apr. 29, 1958 |
| 2,861,034 | Wigner et al. | Nov. 18, 1958 |
| 2,868,708 | Vernon | Jan. 13, 1959 |
| 2,870,076 | Koch | Jan. 20, 1959 |
| 2,915,446 | Liljeblad | Dec. 1, 1959 |

FOREIGN PATENTS

| 282,725 | Switzerland | May 15, 1952 |
| 754,183 | Great Britain | Aug. 1, 1956 |
| 785,945 | Great Britain | Nov. 6, 1957 |
| 1,031,901 | Germany | June 12, 1958 |
| 1,039,659 | Germany | Sept. 25, 1958 |